(No Model.)
E. THOMSON & J. TREGONING.
ELECTRIC WELDING CLAMP.
No. 415,305. Patented Nov. 19, 1889.
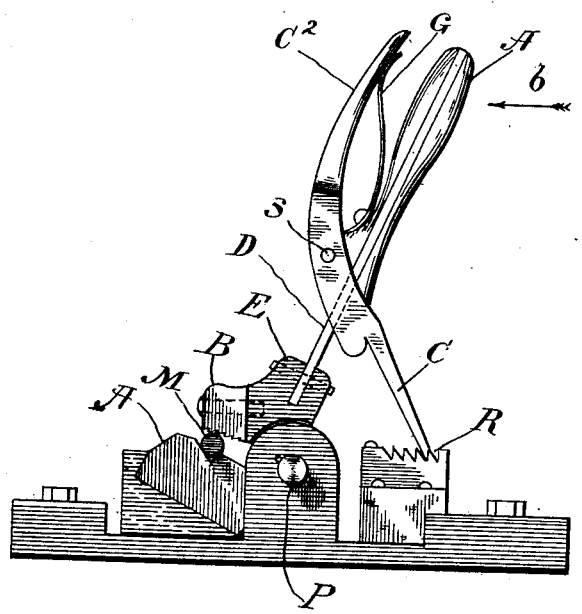
Witnesses
Ira R. Steward.
Thos. H. Capel
Inventor
Elihu Thomson
and
John Tregoning
By their Attorney
H. C. Townsend

UNITED STATES PATENT OFFICE.

ELIHU THOMSON AND JOHN TREGONING, OF LYNN, MASSACHUSETTS.

ELECTRIC WELDING CLAMP.

SPECIFICATION forming part of Letters Patent No. 415,305, dated November 19, 1889.

Application filed August 8, 1889. Serial No. 320,184. (No model.)

*To all whom it may concern:*

Be it known that we, ELIHU THOMSON and JOHN TREGONING, citizens of the United States, and residents of Lynn, in the county of Essex and State of Massachusetts, have invented certain new and useful Electric Welding Clamps, of which the following is a specification.

Our invention relates to clamping devices which may be used for various purposes, but are more particularly adapted for use on electric welding or metal-working machines, such as have been described is various Letters Patent already issued to Elihu Thomson.

Our invention consists, briefly, in a clamp for holding articles such as wires, bars, and irregular-shaped pieces of metal, and in certain combination of parts, which will be hereinafter fully described and illustrated.

In the practice of electric welding and metal-working it is found that the operation of welding or heating the pieces is very short in comparison with the time occupied in placing the pieces in position in the clamps and removing them therefrom.

The object of our invention is therefore to provide means for accomplishing the work of clamping and unclamping with great rapidity, so that the welding capacity of machines may be greatly increased.

To this end our invention consists in the construction of clamp-lever and locking-pawl combined therewith, as hereinafter more particularly described.

In the accompanying drawing, the figure of the drawing is a side elevation of a device embodying our invention.

A indicates the lower clamp or jaw mounted on a suitable bed-plate.

B is the upper jaw, movable to and from the lower, for the purpose of clamping or releasing any object, such as a wire or bar M. The jaw B is preferably loosely connected with its support, as shown, by a pin, so as to permit it to accommodate itself to any irregularity in the object to be grasped.

The clamp-lever is composed of a stiff strong bar-spring D, having a suitable attached or connected handle A. The pivotal point of such lever is indicated at P, where a block E, carrying the spring D and the clamp or jaw B, is pivoted on the base-plate or other suitable support.

C is a catch or pawl pivoted upon the clamp-lever or some part carried thereby, as upon the handle, and provided at $C^2$ with an extension adapted to be grasped by the hand which grasps the handle A.

R indicates a ratchet-block or otherwise suitably-formed piece adapted to be engaged by the catch or pawl C, so as to hold the same and the lever to which it is connected against backward movement. A spring G constantly tends to disengage the catch C.

The operation is as follows: A piece M having been placed in position between the jaws, the clamping-lever is forced in the direction of the arrow $b$, the arm $C^2$ being at such time pressed toward the handle end of the lever, so as to bring the catch C forward on the surface on which it locks. The degree of pressure applied to the clamp or jaw B is determined by the force applied to the handle and exerted through the spring D. When the lever has been moved forward to the extent desired, the catch C will engage and hold it against backward movement to prevent the loosening of the object clamped. To unclamp, it is simply necessary to force the lever A forward again in the direction of the arrow, when the spring G will throw out the catch C from engagement with R and permit the clamping-lever to fall or be moved back.

What we claim as our invention is—

1. In a clamp, the combination of a blade-spring clamp-lever carrying a clamping-jaw, and a catch mounted on said lever and provided with a spring which tends to disengage said catch from the part upon which it locks, as and for the purpose described.

2. In a clamp, the combination, with a pivoted block or support E, carrying or provided with a clamping-jaw, of a stiff blade-spring connected to such block and provided with a handle and a pivoted catch C, such catch being pivoted, as described, so as to be moved with the handle, and being provided with a spring which tends to disengage said catch from a fixed part with which it locks, as and for the purpose described.

Signed at Lynn, in the county of Essex and State of Massachusetts, this 1st day of August, A. D. 1889.

ELIHU THOMSON.
    JOHN TREGONING.

Witnesses:
 JOHN W. GIBBONEY,
 A. L. ROHRER.